March 18, 1969    L. ZANINI    3,432,885
DEVICE FOR THE PRODUCTION OF A CONTINUOUS ENVELOPE FOR RODS, BARS, PIPES AND THE LIKE
Filed June 26, 1967

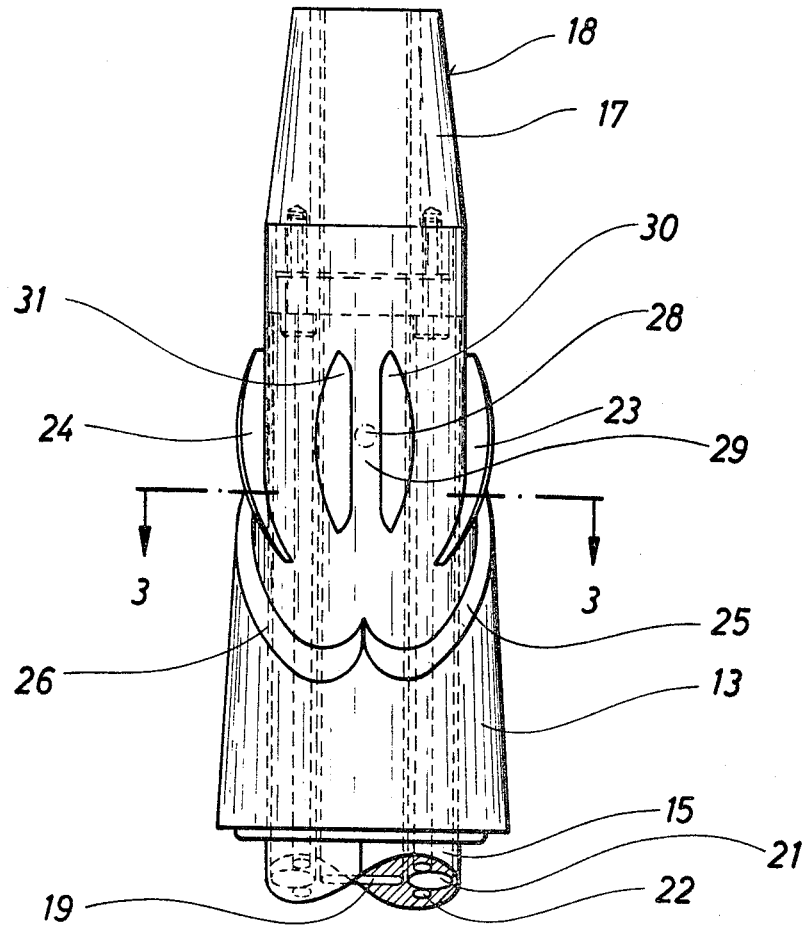

United States Patent Office 3,432,885
Patented Mar. 18, 1969

3,432,885
DEVICE FOR THE PRODUCTION OF A CONTINUOUS ENVELOPE FOR RODS, BARS, PIPES AND THE LIKE
Luigi Zanini, Oderzo-Treviso, Italy
Continuation-in-part of application Ser. No. 397,368, Sept. 16, 1964. This application June 26, 1967, Ser. No. 648,708
Claims priority, application Germany, Jan. 24, 1964, Z 10,603
U.S. Cl. 18—13                    10 Claims
Int. Cl. B29f 3/10

ABSTRACT OF THE DISCLOSURE

A continuous extrusion press for applying an irregularly shaped plastic jacket on a moving core includes a circular nozzle for extruding the jacket and a plurality of transversely adjustable molding jaws for forming the jacket.

---

Figure 1:
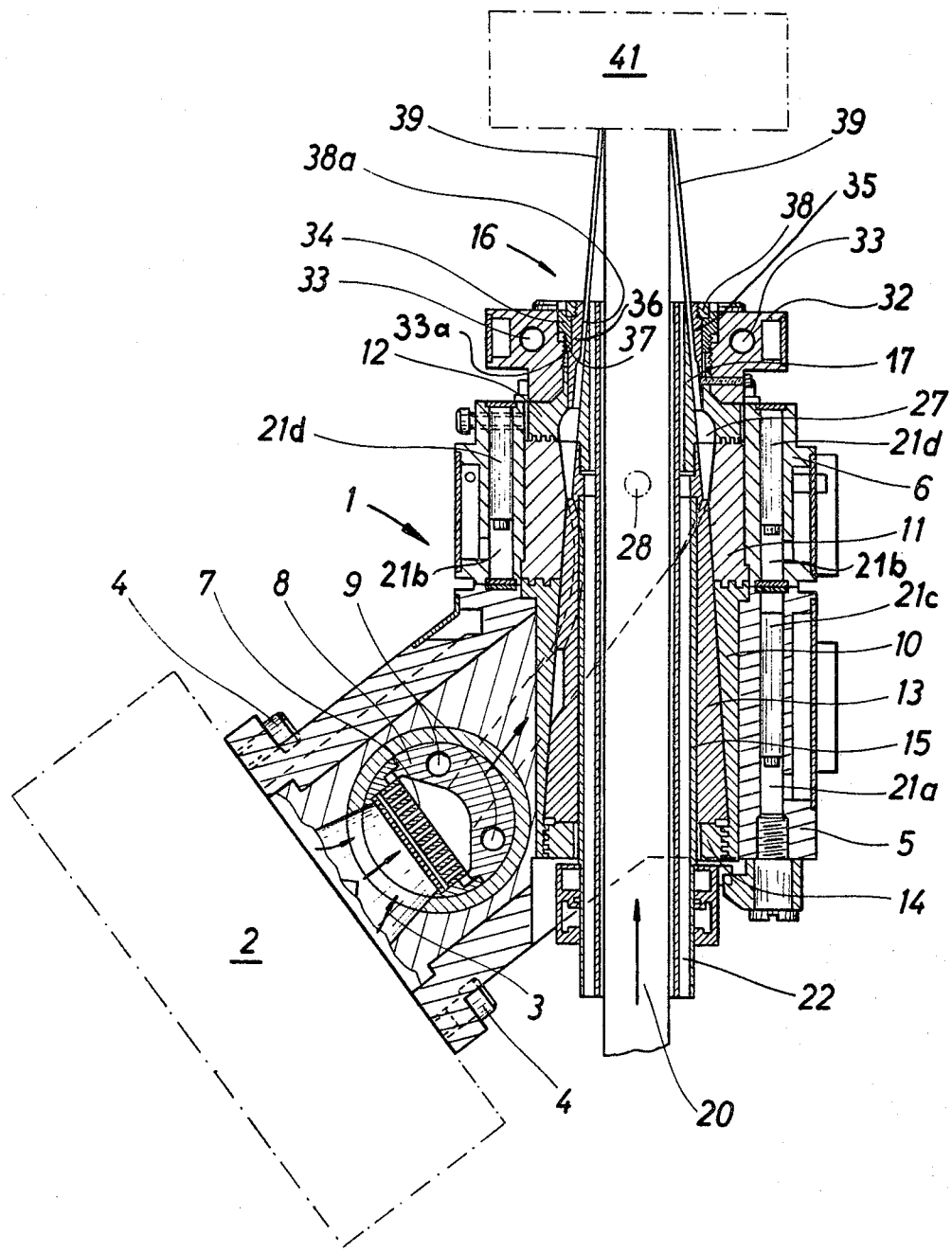

This application is a continuation-in-part of my application Ser. No. 397,368, filed Sept. 16, 1964, now abandoned.

This invention relates to a method of and an apparatus for the continuous production of ledges having indefinite length and consisting of a core bar and a plastic jacket surrounding it, whereby at least the plastic jacket has an outer section profile different from the circular shape and being uniform over its whole length. Such ledges are preferably used for the production of Venetian blinds.

In the production of such ledges the core bar was up to now pushed forward through an extrusion head having an extrusion mouth-piece the bore of which was configured according to the desired outer section shape of the plastic jacket. This method has, however, the drawback that the core bar consisting mostly of wood is exposed within the extrusion head to the high pressure and the increased temperature of the plastic material, so that on the one hand the core bar may be damaged and on the other hand gases and vapors are expelled from the core bar which lift the plastic material from the core bar after leaving the extrusion head and which deform in an uncontrollable manner the said jacket. A further drawback of the known method is that the mouth-piece which is subject to considerable wear is expensive to manufacture and that for each further desired section shape the plastic jacket a separate mouth-piece must be available even if these further section shapes deviate only slightly from the already available shapes. It was, besides these drawbacks, very difficult with the known processes and required long experiments to find a mouth-piece which allowed with section forms differing strongly from the circular shape an approximitely uniform outlet of the plastic material. It is the object of the invention to provide a method and an apparatus which allow the production of plastic-jacketed ledges with high production speed and with practically any desired section shape of the plastic jacket.

A further purpose of the invention is to provide a method and an apparatus in which the mouth piece must not be interchanged for a series of different section profiles of the plastic jacket.

A further object of the invention is to provide a method and an apparatus in which the mouth-piece is adjustable also during the production process in order to regulate the thickness of the plastic jacket.

A still further object of the invention is the production of a plastic jacket which differs greatly in its outer section shape from the section shape of the core bar and which encloses at a predetermined place along the core bar a hollow space while the other parts of the plastic jacket are rigidly connected with the core bar.

The present invention consists generally in the fact that a flexible tube of substantially circular inner and outer section is extruded by the extrusion head without any contact with the core bar and that this core bar is pushed forward through the hollow mandrel of the extrusion head, whereby the flexible tube applies itself only outside of the extrusion head to the core bar and that the core bar is guided in a still deformable state of the flexible tube between the jaws of a cooling and profiling device which produces the desired shape of the plastic jacket by shaping the said flexible tube.

Further objects and advantages are described in the following specification in connection with the drawings.

Figure 4:
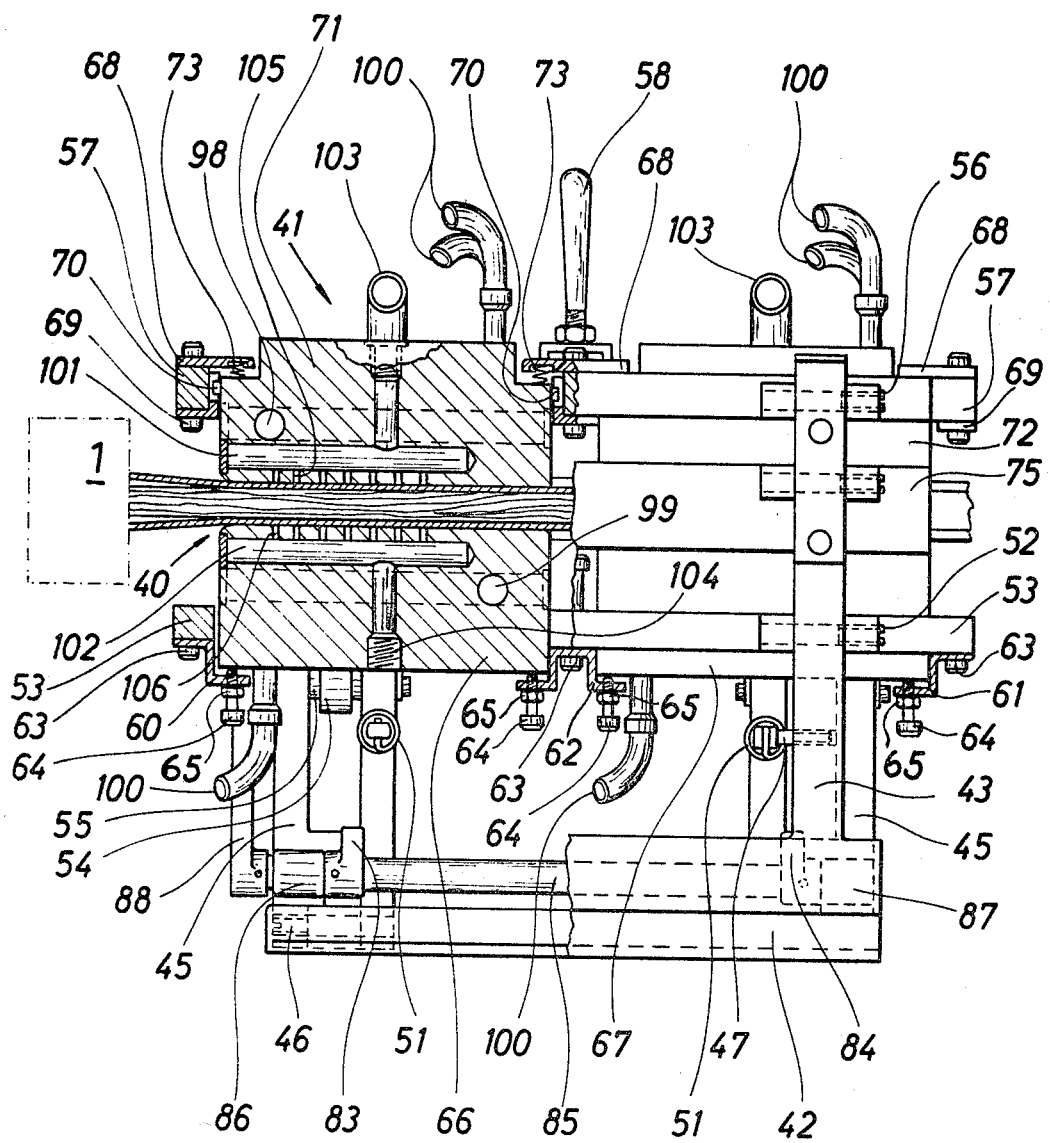
Figure 5:
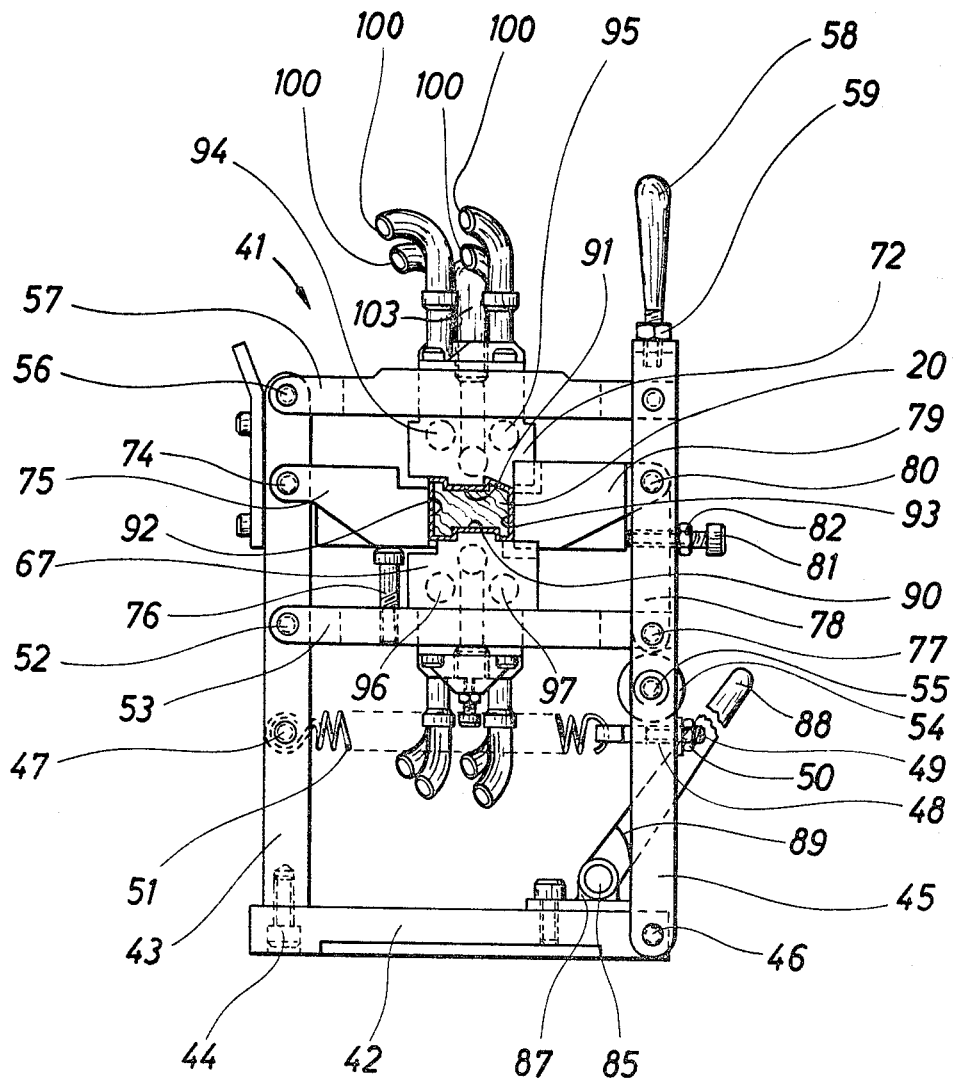
Figures 6, 7, 8, 9:
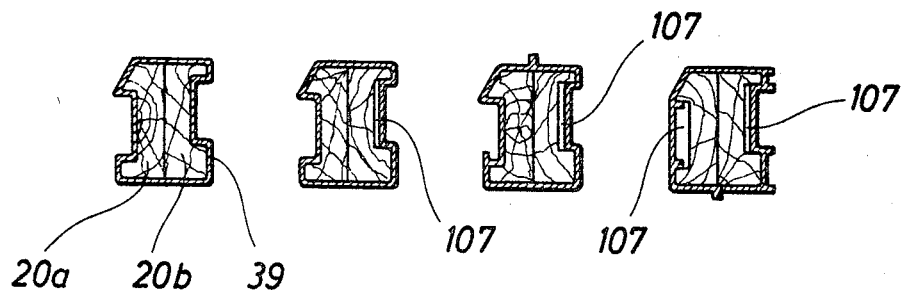

FIG. 1 is a section through a component of the apparatus according to the invention, whereby the extruding press and also the cooling and profiling device forming further components of the apparatus are represented symbolically by rectangles, FIG. 2 is a plan view at an enlarged scale on the hollow mandrel of FIGURE 1, FIG. 3 is a traverse sectional view of the mandrel taken on the section line 3—3 of FIG. 1, FIG. 4 shows the cooling and profiling device, partially in vertical section and partially in lateral view, FIG. 5 is a view of the apparatus according to FIG. 4 seen from the outlet side of the finished plastic-jacketed ledge, FIGS. 6, 7, 8 and 9 are several plastic-jacketed ledges in vertical section manufactured according to the invention.

The apparatus according to the invention consists essentially of an extrusion head 1 and an extrusion press as well as a cooling and profiling device 41.

The extruding press 2 may be of a suitable known embodiment as it is used generally for the working of plastic material, consisting, e.g., of a spiral worm press with two worms. This extruding press 2, which is shown in FIG. 1 symbolically as a block converts the plastic material introduced into it, e.g., in the form of a granulate in a plastic injectable mass which enters into the extrusion head in the direction of the arrows 3.

The extrusion head 1 has a first casing part 5 fastened by means of screws 4 on the extruding press 2. A second casing part 6 is connected with the first part 5.

In the first casing part 5 there is arranged behind the extrusion press 2 a filter device with an interchangeable filter 7 the casing 8 of which has bores 9 in which (not shown) electrical heating cartridges are arranged.

In the casing parts 5 and 6 three bushings 10, 11 and 12 are arranged one behind the other. In the cone-shaped bore of the bushing 10 a guide body 13 is carried and fastened in it by a ring 14 with outer thread. In the cylindrical bore of this guide body a guide tube 15 is introduced. The guide body 13 and the guide tube 15 extend in the direction of the outlet side 16 of the extrusion head 1 in a head part 17 with conical outer surface 18. The guide tube 15 has a large central passage 19 in which the core bar 20 is pushed forward and which is adapted in its section dimensions to the profile of this core bar (see FIG. 3). In the wall of the guide tube 15 a first series of bores 21 is arranged parallel to the passage 19. Electrical heating cartridges (not shown) are provided in the said bores 21 and a second series of bores 22 serving for the aspiration of gases and vapors is likewise provided. The passage 19 and the bores 22 continue in the conical head part 17 and open out on its outer extremity on the outlet side 16 of the extrusion head 1.

Further bores 21a and 21b are arranged parallel to the passage 19 in the walls of the first casing part 5 and the second casing part 6 respectively in which bores are provided electrical heating cartridges 21c and 21d.

On the outer periphery of the guide body 13 guide ribs 23, 24 and guide shoulders 25, 26 are provided which homogenize the plastic material coming from the filter 7 and entering through an opening (not visible in FIGURE 1) between the inner side of the bushing 10 and the outer side of the guide body 13 and which material is guided uniformly into an annnular space 27. A bore may be provided at the place 28 shown by a dot-and-dash line circle in the wall of the bushing 11 and the casing part 6. Through this bore a further not shown extrusion press (which may be constructed as the extrusion press 2) may feed in plastic material of another color in the space 29 between the two color guide ribs 30, 31 protruding from the guide body 13.

The bushing 12 carries a ring 32 provided with tangential bores 33, for receiving electrical heating cartridges (not shown). Into the bore of the ring 32 which is provided with an inner thread 33a a further ring 34 of smaller radial thickness is screwed in. Into the cylindrical bore of this ring 34 a mouth-piece 35 is introduced with its central part 36 cylindrical on its outside and is held on the ring 32 on the one hand by a ring shoulder 37 protruding outward and on the other hand by a threaded ring 38 screwed on the outer threaded part. The inner part of the mouth-piece 35 is—starting from the cited ring shoulder 37—likewise of cylindrical outer configuration, but has a diameter which is equal to or slightly smaller than the inner diameter of the outer part of the bushing 12 which is provided with a cylindrical bore. The mouth-piece 35 has a conical bore 38a forming together with the conical outer surface 18 of the head part 17 a circular opening. Because of its threaded mounting rotating the ring 34 causes it to move in an axial direction, so that the width of the circular opening may be adjusted continually during operation of the device.

In the operation of the apparatus according to the invention a continuous flexible tube 39 of plastic material of circular section is extruded from the extrusion head 1. The core bar 20 is simultaneously pushed forward through the guide tube 15 and the head part 17. The flexible tube has at the outlet point a distance from the core bar and applies itself to it only after a predetermined distance (depending particularly upon the feeding speed of the core bar, the material and the temperature of the flexible tube of plastic material). At this point the inlet side 40 of the cooling and profiling device 41 is arranged to produce the desired outer transverse section shape of the plastic jacket by shaping the flexible tube 39 which is still in a plastic state.

The cooling and profiling device shown in FIGS. 4 and 5 and designated in general by the reference numeral 41 has a base plate 42 along the left lateral edge (FIG. 5) of which a first vertical frame 43 is rigidly fastened with screws 44. Within the range of the right-hand lateral edge (in FIG. 5) of the base-plate 42 there are pivotally carried the lower ends of a second frame 45 around horizontal pivot pins 46.

On two of the upward extending struts of the first frame 43 a pin 47 is fastened while on the second frame 45 at the same height bores 48 are provided which run in a direction towards the pin 47. A screw 49 is screwed into each bore. Each screw has on its outer extremity a nut 50 engaging the frame 45. The other end of each screw 49 is configured as an eyelet. Between each pin 47 and the eyelet of the screw 49 opposite to this pin a helicoidal tension spring 51 is attached under tension, whereby the two tension springs 51 exert a force on the second frame 45 which tends to pivot this latter in the direction towards the first frame 43 around the pivot pins 46.

Above the pins 47 there are provided horizontal pivot pins 52 on the first frame 43 on which a third horizontal frame 53 is pivotally carried. This third frame 53 lies with its extremity opposite to the pivot pins 52 on a roller 54 rotatable round on axle 55 fastened on the second 45.

At the upper extremity of the first frame 43 pivot pins 56 are provided on which a fourth horizontal frame 57 is rotatably carried. The end of this frame 57 opposite to the pivot pins 56 is prevented from an upward pivotable movement by an abutment which is formed by the lower extremity of a handle 58 provided with a thread and screwed into a threaded bore of the second frame 45. The level of this abutment, and thus the upper limit position of the fourth frame 57, may thus be modified by rotating the handle 58 which can be fixed by a lock-nut 59.

Three holding angles 60, 61, 62 running orthogonally to the forward movement of the wooden core bar 20 are fastened on the third horizontal frame 53 by screws 63. These holding angles have vertical threaded bores into which screws 64 secured by lock-nuts 65 are screwed in. In the third frame 53 two lower calibrating jaws 66, 67 are provided lying on the upper ends of the screws 64 and which may be adjusted in their level by rotating the said screws.

Above and beneath the fourth horizontal frame 57 limiting plates 68 and 68 respectively protruding inwardly are fastened, between which projection 70 of the upper two calibrating jaws 71, 72 may carry out a lifting movement limited upward and downward. Between the upper limiting plate 68 and the upper calibrating jaws 71, 72 helicoidal compression springs 73 are arranged which hold the jaws normally in their lower limit positions.

At a point lying between the pivot pins 52 and 56 further horizontal pivot pins 74 are fastened on the first frame 43 on which the (referring to FIG. 5) left-hand calibrating jaw 75 is pivotably carried. This jaw 75 rests upon the head of a screw 76 which is screwed into a vertical threaded bore of the third horizontal frame 53 and which allows adjustment of the position of the jaw 75.

The third frame 53 has at its extremity, resting on the roller 54, a hinge joint 77 by means of which a strut 78 extending vertically upward is fastened. At the upper extremity of the strut, the right-hand calibrating jaw 79 (as seen in FIG. 5) is fastened by means of an articulation 80. The jaw 79 engages on the inner end of a screw 81 which may be fixed by a lock-nut 82. The position of the jaw 79 with respect to the second frame 45 may be adjusted by rotating the screw 81 while the frame is held against pivoting movement towards the interior under the bias of the spring 51 by two cams 83, 84. These cams are rigidly fastened on a shaft 85 carried rotatably in two bearings 86, 87 fastened on the base plate 42. An operating lever 88 is fixed on the shaft 85.

The angular position of the shaft and the cams 83, 84 may be changed by means of the lever. As the cams have progressively rising contact surfaces 89 it is possible, by operating the lever 88, to adjust the position of the second frame and thus the distance of the right-hand jaw 79 from the left-hand jaw 75. It must be emphasized that the axes of the components 46, 47, 52, 55, 56, 74, 77, 80 and 85 are all parallel to the direction of movement of the core 20.

The inner surfaces 90, 91, 92 and 93 of the calibrating jaws 66, 67, 71, 72, 75, 79 facing each other have the shape of the plastic jacket 39a produced by forming the tube 39. Each one of the two upper calibrating jaws 66, 67 has two bores 94, 95 and 96, 97 respectively which are each in connection with each other at their one extremities by means of a transverse bore 98 and 99 respectively, while their other extremities are connected with connection pieces 100, for the inlet and the outlet of a cooling medium (e.g. water). Similar bores and connection pieces for the circulation of a cooling medium may be provided for the lateral jaws 75 and 79.

Besides this arrangement each upper and lower calibrating jaw 71, 72 and 66, 67 respectively have chambers 101 and 102 respectively which are in connection with a connecting piece 103 and 104 respectively which is connected to a source of vacuum (not shown). From these chambers 101, 102 a multitude of bores 105 and 106 extend to the inner surfaces 91 and 90 respectively. Thus it is possible to lift off the plastic jacket 39a from the core bar 20 at predetermined locations, so that a hollow space 107 extending in longitudinal direction of the core bar is formed.

The core bar fed into the extrusion head 1 is preferably made from short sections of wood bars which are glued together in a continuous operation. A core bar may, for instance, be composed of two parallel partial bars 20a and 20b (cf. FIG. 6) with the joints of the successive sections of one partial bar being in staggered relation to the joints of the other partial bar. After being glued together the raw core bar may be continuously milled to the desired profile section before feeding the same to the extrusion head.

I claim:

1. Apparatus for the continuous production of ledges of indefinite length of the type comprising a core bar surrounded by a plastic jacket having an irregular outer cross-sectional profile, said apparatus including an extrusion head and a cooling and profiling device, said cooling and profiling device being arranged adjacent the outlet of and coaxially with respect to the extrusion head, said head comprising a mandrel having a central bore for axially movably receiving a core bar and including a mouth-piece surrounding the mandrel and forming therewith a circular extrusion nozzle, said cooling and profiling device comprising jaws provided with cooling means, said jaws being secured against movement in the direction of movement of the core bar, at least one of said jaws having resilient mounting means for limited movement transverse to the direction of movement of a core bar, the inner surfaces of said jaws forming an elongated mold surrounding the plastic jacket and having a uniform cross-sectional profile along the length thereof corresponding to the desired profile of the plastic jacket.

2. Apparatus as claimed in claim 1 wherein the head part of said mandrel and the mouth-piece surrounding it both have a conical configuration and wherein said mouth-piece is longitudinally adjustable with respect to said head part for adjusting the radial dimensions of the circular extrusion nozzle.

3. Apparatus as claimed in claim 2 wherein said mouth-piece is mounted in threaded engagement with the housing of the extrusion head.

4. Apparatus as claimed in claim 1 wherein the central bore of said mandrel is formed in accordance with the outer sectional profile of the core bar.

5. Apparatus as claimed in claim 1 wherein the wall of said mandrel is provided with bores parallel to said central bore which bores are open to the outlet side of the extrusion atmosphere at their other ends.

6. Apparatus as claimed in claim 1 wherein the wall of said mandrel is provided with bores parallel to said central bore for receiving electrical heating cartridges.

7. Apparatus as claimed in claim 1 wherein a series of bores are provided in the wall of the housing of the extrusion head for receiving electrical heating cartridges.

8. Apparatus as claimed in claim 1 wherein at least one of the inner surfaces of the jaws are provided with apertures connected to a vacuum source.

9. Apparatus as claimed in claim 8 wherein said apertures extend between said inner surface and a vacuum chamber provided within said jaw which chamber is connected to a vacuum source.

10. Apparatus as claimed in claim 1 wherein cooling means for the jaws are formed by bores within said jaws, said bores being connected in a circulation circuit for a cooling medium and being in communication with connection pieces for the inlet and the outlet of the cooling medium.

References Cited

UNITED STATES PATENTS

| 830,201 | 9/1906 | Blondel. |
|---|---|---|
| 2,025,666 | 12/1935 | Hanff. |
| 2,291,670 | 8/1942 | Wiley et al. |
| 2,399,422 | 4/1946 | Back. |
| 2,452,607 | 11/1948 | Slaughter. |
| 2,575,138 | 11/1951 | Slaughter. |
| 2,607,953 | 8/1952 | Richardson et al. |
| 2,760,228 | 8/1956 | Verges. |
| 2,766,806 | 10/1956 | Rothermel et al. |
| 2,956,305 | 10/1960 | Raydt et al. |
| 3,088,166 | 5/1963 | Colombo. |
| 3,169,272 | 2/1965 | Maxson. |
| 3,239,884 | 3/1966 | Seidel et al. |
| 3,243,850 | 4/1966 | Zieg. |
| 3,274,313 | 9/1966 | Harp. |
| 3,286,305 | 11/1966 | Seckel. |
| 3,296,661 | 1/1967 | De Moustier. |

FOREIGN PATENTS

| 218,292 | 1958 | Australia. |
|---|---|---|
| 1,160,743 | 1958 | France. |

WILLIAM J. STEPHENSON, *Primary Examiner.*

U.S. Cl. X.R.

18—14, 19